(12) United States Patent
Krummrich

(10) Patent No.: US 6,768,579 B2
(45) Date of Patent: Jul. 27, 2004

(54) OPTICAL AMPLIFIER ARRANGEMENT HAVING A VARIABLY SETTABLE ATTENUATOR

(75) Inventor: Peter Krummrich, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/934,137

(22) Filed: Aug. 20, 2001

(65) Prior Publication Data

US 2002/0093727 A1 Jul. 18, 2002

(30) Foreign Application Priority Data

Aug. 18, 2000 (DE) .......................................... 100 40 472

(51) Int. Cl.$^7$ ................................................ H04B 10/12
(52) U.S. Cl. ................ 359/337.1; 359/337; 359/337.1; 359/337.11
(58) Field of Search ................... 359/339, 337–337.11, 359/337.2

(56) References Cited

U.S. PATENT DOCUMENTS

| | | | | |
|---|---|---|---|---|
| 5,530,583 A | | 6/1996 | Uno et al. ................... | 359/341 |
| 5,745,276 A | * | 4/1998 | Ho et al. ..................... | 398/209 |
| 5,894,362 A | * | 4/1999 | Onaka et al. ................ | 359/124 |
| 6,057,959 A | * | 5/2000 | Taylor et al. .......... | 359/337.13 |
| 6,151,157 A | * | 11/2000 | Ball et al. .............. | 359/337.12 |
| 6,157,025 A | * | 12/2000 | Katagiri et al. ............. | 250/226 |
| 6,268,954 B1 | * | 7/2001 | Cheng ........................ | 359/337 |
| 6,359,726 B1 | * | 3/2002 | Onaka et al. ............ | 359/337.1 |
| 6,483,631 B1 | * | 11/2002 | Cheng et al. .......... | 359/337.11 |
| 2001/0036005 A1 | * | 11/2001 | Hatayama et al. ....... | 359/337.1 |

FOREIGN PATENT DOCUMENTS

| | | | | |
|---|---|---|---|---|
| EP | 1052745 A2 | * | 11/0000 | ........... H01S/3/067 |
| EP | 0 991 152 | | 4/2000 | |
| EP | 1 003 253 | | 5/2000 | |
| EP | 1067725 A2 | * | 1/2001 | ............ H04J/14/02 |
| WO | WO 99/43117 | | 8/1999 | |

OTHER PUBLICATIONS

Kinoshita et al. Fujitsu Sci. Tech. J. 35, Jul. 1, 1999.*
Frenkel et al. J. Of Lightwave Tech. vol. 7, No. 4, Apr. 1989.*
Katagiri et al. IEEE Phot. Tech. Letts. vol. 11, No. 1, Jan. 1999.*
Akimoto et al. IEEE Phot. Tech. Letts, vol. 12, No. 6, Jun. 2000.*
Liang et al. An erbium–doped fiber amplifier with dynamically gain–flattened spectrum. Feb. 22–27, 1998. OFC '98 Technic Digest.*
Inoue et al. Tunable gain equalization using a mach–zehnder optical filter in multistage fiber amplifiers. IEEE Phot. Tech. Letts. vol. 3, No. 8, Aug. 1991.*
Mekada et al. Polarization independent, linear–tuned interference filter with constant transmission characteristics over 1530–1570–nm tuning range. IEEE Phot. Tech. Letts. vol. 9, No. 6, Jun. 1997.*

* cited by examiner

Primary Examiner—Thomas G. Black
Assistant Examiner—Stephen Cunningham
(74) Attorney, Agent, or Firm—Bell Boyd & Lloyd LLC

(57) ABSTRACT

An optical amplifier arrangement having at least one optical amplifier stage (V1, V2) and a variably settable attenuator (VDL), whose attenuation spectrum (DV2, DV3, DV5, DV6) assumes an attenuation profile (DV2, DV3, DV5, DV6) that increases or decreases proportionally to wavelength. To reduce tilt of the channel level spectrum of an optical transmission signal, the profile of the attenuation spectrum (DV2, DV3, DV5, DV6) is variably settable. An advantageous structure of the variably settable attenuator according to the invention is furthermore specified.

16 Claims, 4 Drawing Sheets

OPTICAL AMPLIFIER ARRANGEMENT HAVING A VARIABLY SETTABLE ATTENUATOR

BACKGROUND OF THE INVENTION

The invention relates to an optical amplifier arrangement having at least one optical amplifier stage and a variably settable attenuator.

Wavelength-division multiplexing (WDM) of optical transmission systems makes it possible to increase the transmission capacity of the optical transmission system, or WDM transmission system, by adding further WDM channels without any increase of the respective channel data rate. Optical amplifiers, or fiber amplifiers, arranged along the optical transmission path, are normally used to amplify simultaneously all the WDM channels, or WDM signals, transmitted via the optical transmission fiber. In order to avoid the problematic quality differences which occur in this case for the optical WDM channels at the end of the optical transmission path, it is necessary in particular that the WDM channels, or the WDM signals, have virtually the same signal level in each case at the amplifier inputs and outputs.

In optical WDM transmission systems, a variety of parameters which are responsible for, or give rise to, channel level differences in WDM signals are known. These include the wavelength dependency of the attenuation by passive components, which does not vary, or varies only slightly, during operation of the optical transmission path. Other effects are dependent on the operating state of the optical WDM transmission system, for example on the number of active WDM channels or on the ambient temperature, and hence result in variations during operation of the WDM transmission system.

In optical WDM transmission systems with large WDM channel numbers, which occupy a wide wavelength range and, at the same time, require a high total power at the input of the optical transmission fiber, a significant tilt of the channel level spectrum in each optical transmission path section is caused by the non-linear effect of stimulated Raman scattering (SRS) in the optical transmission fiber. In this case, the degree of tilt, or the level difference, of the respective WDM channel having the shortest and longest wavelength is dependent on the number of active WDM channels and is altered by switching further WDM channels on or off.

Furthermore, the channel level differences are produced, within the optical WDM signal to be transmitted, owing to the temperature dependency of the gain spectrum of the active fiber of optical fiber amplifiers. Especially in the case of erbium-doped fiber amplifiers, which are operated in the L transmission band (wavelength range of approximately 1570 to 1605 nm), any change in the ambient temperature leads to a significant tilt of the gain spectrum of the active fiber of the optical fiber amplifier.

Both SRS and the temperature dependency of the active fiber cause, at first approximation, a virtually dB-linear tilt of the channel level spectrum of the optical WDM signal. In the case of a dB-linear tilt, the level difference (in dB) between a WDM channel and its respectively neighbouring WDM channel—assuming a constant wavelength spacing of the WDM channels—has the same value in each case for all WDM channels.

In WDM transmission systems produced to date, the wavelength dependency of the gain spectrum of the active fiber of optical fiber amplifiers is usually leveled by using an optical filter having inverse attenuation response, so as to reduce the channel level differences at the end of the optical transmission path which are due to the tilt of the gain spectrum. Such an optical filter is configured, for a given working point, in such a way that the remaining gain variation is limited to less than 1 dB over all the WDM channels. If the working point of the optical fiber amplifier is altered, i.e. if the gain of the active fiber is altered, then the gain spectrum tilts—dynamic gain tilt.

One approach to compensating for the gain tilt involves splitting the optical amplifier into several optical amplifier stages. For instance, in the case of a 2-stage optical fiber amplifier, an attenuator which is preset to a fixed value and has a flat attenuation spectrum is interconnected between the first and second amplifier stages, and is used to compensate at least partially for the gain tilts in total due to the first and second amplifier stages. To that end, the individual amplifier stages are in each case regulated to a constant total output power, and the attenuator with a flat attenuation spectrum, which is interconnected between the amplifier stages, is therefore preset so that the gain of the two optical amplifier stages remains virtually constant.

It is furthermore possible to modify the regulation of the individual amplifier stages by regulating the individual amplifier stages not to a constant total output power, but rather to a constant gain. If the level at the input of the first amplifier stage rises, then its output level is also increased. The level at the input of the subsequent amplifier stage is kept constant since the attenuator with a flat attenuation spectrum, which is inserted between the amplifier stages, avoids passing on the level increase from its input to its output by increasing the attenuation value which is set. However, any increase in the attenuation between the amplifier stages impairs the noise properties of the overall two-stage amplifier arrangement.

When using a variable attenuator with a flat attenuation spectrum, only minor compensation for the tilt of the channel spectrum of the optical WDM signals, due to SRS or the temperature dependency of the active fiber of the optical fiber amplifier, is therefore possible.

A virtually dB-linear tilt of the channel level spectrum is also caused by a change in the gain of the active fiber of an optical fiber amplifier. The gain, or the gain spectrum, of the optical fiber amplifier can be adjusted, for constant input and output signal levels of the optical fiber amplifier, by changing the setting of a variable attenuator with a flat attenuation spectrum, so as to set a suitable tilt of the gain spectrum which virtually compensates for the constant part of the dB-linear tilt due to SRS or a temperature change. The disadvantage of this method is that it is only possible to reduce tilts, due to the active fiber of the optical fiber amplifier, which have a small amplitude. See, in particular, U.S. Pat. No. 5,530,583. To balance a strong tilt of, for example, 4 dB, it is therefore sometimes necessary to increase the inserted attenuation of the variable attenuator by more than 10 dB. Such a high additional inserted attenuation contributes to a significant increase in the noise factor of the optical fiber amplifier.

SUMMARY OF THE INVENTION

An advantage of the invention is to provide an optical amplifier arrangement with which it is possible to reduce channel level differences due to changes of the operating state of the optical WDM transmission system, for example as a result of switching channels on and off or temperature changes.

In an embodiment, on optical amplifier arrangement is provided having at least one optical amplifier stage (V1, V2) and a variably settable attenuator (VDL). The variably settable attenuator (VDL) has an attenuation spectrum (DV2, DV3, DV5, DV6) that increases or decreases proportionally to wavelength. The profile of the attenuation spectrum is variably settable in order to reduce any tilt of the channel level spectrum.

An aspect of the method according to the invention is that the variably settable attenuator has an attenuation spectrum that increases or decreases proportionally to wavelength, the profile of the attenuation spectrum being variably settable in order to reduce any tilt of the channel level spectrum. Advantageously, the channel level tilt of the optical transmission signal can be reduced with substantially less inserted attenuation, compared with compensation when using a settable attenuator with a flat attenuation spectrum, which leads to an improvement in the noise ratio of the optical amplifier arrangement. Furthermore, the attenuation spectrum with an inverse attenuation profile with respect to the tilt of the channel level spectrum can be approximated substantially more accurately by the variably settable attenuator than when using the dynamic gain tilt of the active fiber of the optical fiber amplifier.

A further advantageous aspect of the invention involves a variably settable attenuator that has a displaceably mounted filter, which is constructed from a transparent substrate into which ions or atoms with a suitable absorption spectrum are diffused, or onto which ions or atoms with a suitable absorption spectrum are deposited. In order to produce different attenuation values, the concentration of the absorbing ions or atoms increases or decreases along the displacement direction of the displaceably mounted filter. Such an embodiment of a variable settable attenuator, particularly intended to reduce tilts of the channel level spectrum within an optical amplifier arrangement, can be produced without any significant technical outlay and inexpensively. Furthermore, a wide variety of attenuation spectra can be produced for a plurality of possible tilts of the channel level spectrum by using the attenuator according to the invention. Such a variably settable attenuator can be provided at any desired points of an optical transmission system where, for example, dB-linear tilts of the channel level spectrum, for example of an optical transmission signal OS, are to be substantially compensated for or reduced.

In an embodiment, the optical amplifier arrangement, has an attenuation spectrum (DV2, DV3, DV5, DV6) that increases or decreases proportionally to wavelength is dB-linear.

In an embodiment, the optical amplifier arrangement, the increase of the dB-linear attenuation spectrum is set by the attenuation value ($D_{max1}$, $D_{max2}$) needed for the attenuation of the smallest or largest wavelength ($\lambda 1$, $\lambda 2$).

In an embodiment of the optical amplifier arrangement has a control unit or a regulating unit provided for driving the variably settable attenuator (VDL).

In an embodiment of the optical amplifier arrangement, a settable attenuator (VDF) with a flat attenuation spectrum, having virtually the same attenuation per channel, is provided for further reducing the dB-linear tilt of the channel level spectrum.

In an embodiment of the optical amplifier arrangement, an optical filter (GEF) is provided for leveling the gain spectrum of the at least one optical amplifier stage (V1, V2).

In an embodiment of the optical amplifier arrangement, a further variably settable attenuator is provided in addition to the one variably settable attenuator (VDL), the tilt of the channel level spectrum due to stimulated Raman scattering being reduced by the one variably settable attenuator and, separately, the further tilt of the channel level spectrum due to the temperature dependency of the active fibers of the at least one amplifier stage (V1) being reduced by the further variably settable attenuator.

In an embodiment of the optical amplifier arrangement, the one and the further variably settable attenuators (VDL) are arranged upstream or downstream of the at least one optical amplifier stage (V1, V2) or between at least two optical amplifier stages (V1, V2).

In an embodiment, a variably settable attenuator, in particular for reducing tilts of a channel level spectrum within an optical amplifier arrangement (OVA), has a displaceably mounted filter (F), which is constructed from a transparent substrate (TT) into which ions or atoms (AA) with a suitable absorption spectrum (a) are diffused, or onto which ions or atoms (AA) with a suitable absorption spectrum (a) are deposited. In order to produce different attenuation profiles (DV1 to DV5), the concentration of the absorbing ions or atoms (AA) increases or decreases along the displacement direction (A) of the displaceably mounted filter (F).

In an embodiment of the variably settable attenuator, a first and a second gradient lens (GL1, GL2) are provided, the displaceably mounted filter (F) being arranged between the first and second gradient lenses (GL1, GL2) and separated from them by a first and a second free-beam region (FB1, FB2).

In an embodiment of the variably settable attenuator, the first gradient lens (GL1) is intended to focus an optical signal (OS) injected via the input and to project the focused optical signal onto the displaceably mounted filter (F), and the second gradient lens (GL2) is intended to focus the optical signal (OS) attenuated by the displaceably mounted filter (F) and to project the focused, attenuated optical signal (OS) onto the output of the variably settable attenuator (VDL).

In an embodiment of the variably settable attenuator, the concentration of the absorbing ions or atoms (AA) increases or decreases at least virtually uniformly along the displacement direction (A) of the displaceably mounted filter.

In an embodiment of the variably settable attenuator, the displaceably mounted filter (F) is produced as a rotatably mounted filter disc (F) made of a transparent substrate (TT).

In an embodiment of the variably settable attenuator, the concentration of the absorbing ions or atoms (AA) is virtually constant at the site where the focused optical signal (OS) strikes the transparent substrate (TT).

In an embodiment of the variably settable attenuator, the variably settable attenuator (VDL) has a dB-linear attenuation profile (DV1 to DV6) that increases or decreases proportionally to wavelength ($\lambda$).

In an embodiment of the variably settable attenuator, the attenuation properties of the variably settable attenuator (VDL) can be set by moving the displaceably mounted optical filter (F) along the displacement direction (A).

In an embodiment of the variably settable attenuator, the shape of the attenuation spectrum and of the usable wavelength range (WB) of the variably settable attenuator (VDL) is dependent on the diffused or deposited ions or atoms (AA1, AA2).

In an embodiment of the variably settable attenuator, a plurality of different ions and/or atoms (AA1, AA2) with different absorption spectra (S1, S2) are deposited onto the transparent substrate (TT) or are diffused into the transparent substrate (TT), their absorption spectra being superimposed.

In an embodiment of the variably settable attenuator, the focused optical signal (OS) is projected perpendicularly onto the transparent substrate (TT) of the displaceably mounted filter (F) by using the first gradient lens (GL1).

In an embodiment of the variably settable attenuator, the focused optical signal (OS) is projected, by using the first gradient lens (GL1), at an angle of less than 90 degrees onto the transparent substrate (TT), arranged along the displacement axis (A), of the displaceably mounted filter (F), in order to avoid reflections.

In an embodiment of the variably settable attenuator, the transparent substrate (TT) is divided into a first and a second attenuation region (DB1, DB2), whose absorption spectra (S1, S2) are different.

In an embodiment of the variably settable attenuator, the absorption spectra in each case have the smallest attenuation value ($D_{min}$) on at least one contact line of the first and second attenuation regions (DB1, DB2), and the attenuation value (a) rises with increasing distance along the displacement axis (A) from the at least one contact line.

In an embodiment of the variably settable attenuator, the filter disc (F) is rotatably mounted about a rotation axis (A), and in that the concentration of the absorbing ions or atoms (AA) increases or decreases at least virtually uniformly along the rotation direction of the rotatably mounted filter disc (F).

Additional features and advantages of the present invention are described in, and will be apparent from, the following Detailed Description of the Invention and the figures.

DETAILED DESCRIPTION OF THE INVENTION

Figure 1:
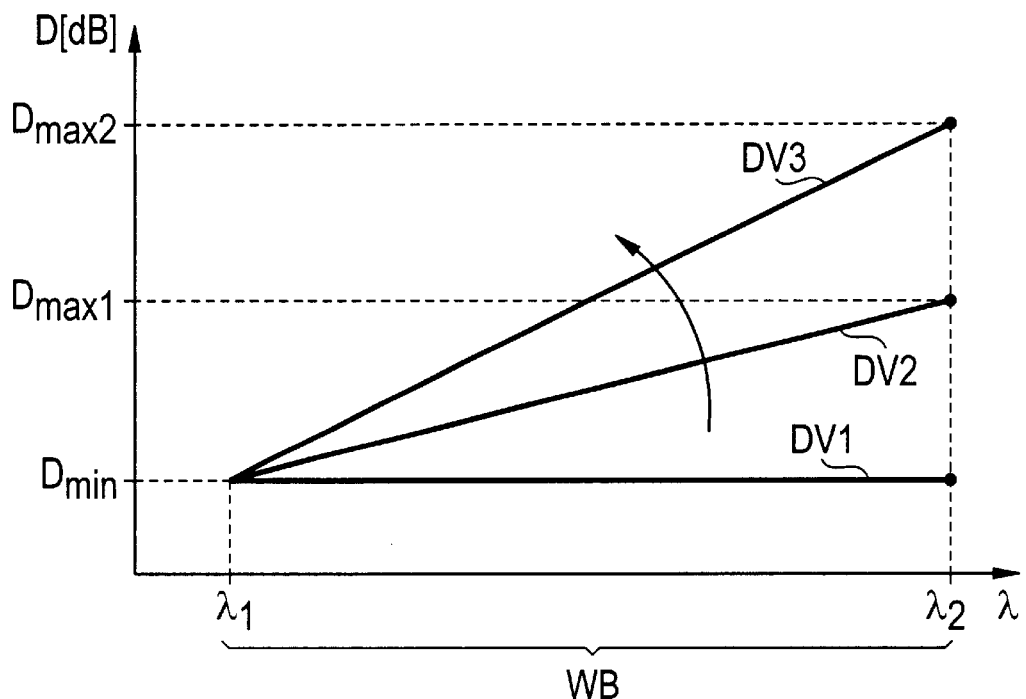
FIG. 1 is a diagram showing three attenuation profiles for a selected wavelength range.

FIG. 1 represents in a diagram, by way of example, the profile of the attenuation D, or inserted attenuation, needed to compensate for tilts of the channel level spectrum, as a function of wavelength $\lambda$. A first, second and third attenuation profile DV1, DV2, DV3 being represented by way of example, with a different respective dB-linear tilt for any wavelength range WB extending from a first wavelength $\lambda_1$ to a second wavelength $\lambda_2$. The diagram in FIG. 1 has a horizontal axis $\lambda$ and a vertical axis D. The wavelength $\lambda$ is plotted on the horizontal axis $\lambda$, and the different attenuation values D in dB are plotted on the vertical axis D. The dB-linear tilts, for example, of the signal level spectrum of the optical transmission signal, or optical signal OS, which are due to stimulated Raman scattering (SRS) or the temperature dependency of an erbium-doped active fiber operated, for example, in the L transmission band, are approximately replicated by the profile of the second and third attenuation profiles DV2, DV3 in FIG. 1. The dB-linear tilt is attributable to the constant wavelength spacings between WDM channels of the optical signal OS, which have a level difference in dB of the same value in each case between one channel and its neighbouring channel. The first to third attenuation profiles DV1 to DV3 represented in FIG. 1 represent the attenuation spectrum of the variably settable attenuator, for example of the variably settable attenuator provided in the optical amplifier arrangement OVA according to the invention, from which it is possible to see the dB-linear attenuation spectrum that increases or decreases proportionally to wavelength $\lambda$.

According to the invention, the slopes, or the increase, of the dB-linear attenuation profiles DV1, DV2, DV3 are varied in order to reduce the dB-linear tilts of the channel level spectrum. The first attenuation profile DV1 has a flat attenuation spectrum, i.e. the first attenuation profile DV1 has the attenuation minimum $D_{min}$ at the first wavelength $\lambda_1$, over the entire wavelength range WB, and at the second wavelength $\lambda_2$. Virtually uniform compensation for all WDM channels transmitted in the wavelength range WB is possible with an attenuator having such a flat first attenuation profile DV1.

The second attenuation profile DV2 represented in FIG. 1 has a greater increase compared with the first attenuation profile DV1, which is crucially established by the first maximum attenuation value $D_{max1}$, at the second wavelength $\lambda_2$, which is likewise greater than the minimum attenuation value $D_{min}$. The first maximum attenuation value $D_{max1}$, which lies at the edge of the used wavelength band or wavelength range WB, can be specifically set to establish the tilt of the attenuation spectrum, i.e. the increase of the dB-linear attenuation spectrum of the second attenuation profile DV2 can thereby be established or set.

The third attenuation profile DV3 has a further increase compared with the second attenuation profile DV2, with respect to the slope, which can in turn be set by the second maximum attenuation value $D_{max2}$, which is present at the edge of the wavelength range WB, i.e. at the second wavelength $\lambda_2$.

Figure 2:
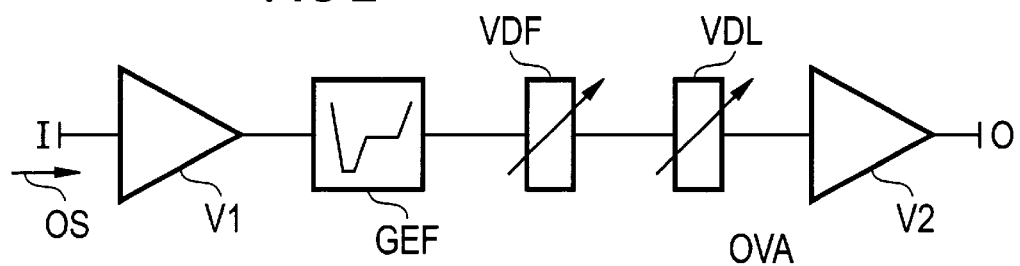
FIG. 2 is a schematic diagram showing an optical amplifier arrangement according to the invention.

FIG. 2 represents a possible embodiment of the optical amplifier arrangement OVA according to the invention, which has an input I, an output O, a first amplifier stage V1, an optical filter GEF and a first variably settable attenuator VDF, with an attenuation profile that is constant as a function of wavelength $\lambda$, i.e. flat, a second variably settable attenuator VDL, with an attenuation profile that increases or decreases linearly as a function of wavelength $\lambda$, and a second amplifier stage V2. Connected to the input I of the optical amplifier arrangement OVA is the input of the first amplifier stage V1, to the output of which the input of the optical filter GEF is fed. The output of the optical filter GEF is connected to the input of the first variably settable attenuator VDF, and its output is connected to the input of the second variably settable attenuator VDL. The output of the second variably settable attenuator VDL is fed to the input of the second amplifier stage V2, the output of which is connected to the output O of the optical amplifier arrangement OVA.

An optical signal OS, for example an optical WDM signal OS with a plurality of WDM channels having different wavelengths, is injected into the optical amplifier arrangement OVA at the input I of the optical amplifier arrangement OVA. The optical signal OS is pre-amplified by using the first amplifier stage V1 which, for example, may be embodied as an optical amplifier having an erbium-doped active fiber. The optical signal OS pre-amplified in this way is transmitted to the optical filter GEF for levelling the gain spectrum of the optical signal OS. The distortion of the gain spectrum, due to the wavelength dependency of the gain spectrum of the active fiber of the first and second amplifier stages V1, V2, is leveled by using the optical filter GEF. To that end, the optical filter GEF has, for example, an inverse attenuation profile. The optical filter GEF is, for example, configured for a given working point in such a way that the remaining gain variation between the strongest and weakest WDM channels is limited to less than 1 dB. A change of the working point of the first amplifier V1, for example by switching optical WDM channels on or off or by changing the gain of the active fiber of the first optical amplifier stage V1, leads to a tilt of the gain spectrum—dynamic gain tilt. After passing through the optical filter GEF, the optical signal OS is transmitted to the settable optical attenuator VDF. The variable attenuator VDF has a flat attenuation spectrum, for example the attenuation spectrum having the first attenuation profile DV1 represented in FIG. 1.

The attenuation spectrum of the first settable attenuator VDF, for a uniform rise of all the channel levels, or WDM channel levels, of the optical signal OS at the input of the first amplifier stage V1 and for constant channel levels at the output of the second amplifier stage V2, is raised proportionally thereto. Similarly, the attenuation spectrum of the first settable attenuator VDF, for a decrease of the channel levels at the output of the second amplifier stage V2 and for constant input channel levels at the input of the first amplifier stage V1, is decreased proportionally. In this case, the aim is to keep constant the sum of the gains of the active fibers of the first and second amplifier stages V1, V2, respectively.

The dB-linear tilt of the channel level spectrum at the input of the first amplifier stage V1, for example due to SRS, is substantially compensated for or reduced by using the second variable settable attenuator VDL according to the invention, which is connected downstream of the first settable attenuator VDF. The second variably settable attenuator VDL has, depending on the setting, an attenuation profile similar to the first, second or third attenuation profiles DV1, DV2, DV3, for example, which are represented in FIG. 1. In this case, the set attenuation difference, or the rise of the attenuation profile DV2 to DV3 is dependent on the minimum to second maximum attenuation values $D_{min}$ to $D_{max2}$ at the edges of the used wavelength band WB. The attenuation difference set in this way hence corresponds to the channel level difference of the edge channels of the wavelength band WB at the input of the first amplifier stage V1. The optical signal OS present at the output of the second variably settable attenuator VDL hence has a virtually flat channel level spectrum.

The second variably settable attenuator VDL can be driven, for example, via a control unit or a regulating unit, which are not explicitly explained in the represented exemplary embodiment in FIG. 2. In the case of control, the compensation for the channel level tilt due to stimulated Raman scattering requires knowledge of the injected total power in the transmission fiber, the width of the wavelength band WB occupied by active channels and the fiber properties. This information can, for example, be conveyed from the system control of the optical transmission system, via the control unit, to the optical amplifier arrangement OVA.

From this information, it is possible to calculate the level difference ΔP in dB of the respective WDM channels lying at the edges of the wavelength band WB, for example, by evaluating the following formula:

$$\Delta P = 10 * \log(e) \text{ dB} * P_{tot} * \frac{L_{eff}}{2 * A_{eff}} * g_{R,\max} * \frac{\Delta f_K}{\Delta f_R}$$

Here, $P_{tot}$ denotes the total power of all channels at the input of the transmission fiber, $L_{eff}$ denotes the effective length of the transmission fiber, $A_{eff}$ denotes the effective mode field area, $g_{R,max}$ denotes the maximum Raman coefficient, $\Delta f_K$ denotes the frequency spacing of the two edge channels of the band and $\Delta f_R$ denotes the frequency spacing between the channel with the highest frequency and the frequency at which the maximum Raman coefficient occurs. In order to compensate for precisely this calculated or determined level difference ΔP, the attenuation profile of the variably settable attenuator VDL is set in such a way that its attenuation values at the edges of the used wavelength band WB have the same level difference ΔP.

A further alternative to control the compensation for the tilt of the channel level spectrum due to the temperature dependency of the active fiber of the first amplifier stage V1 is carried out in a similar way. To that end, a temperature sensor, not represented in FIG. 2, is attached to the active fiber of the optical amplifier stages V1, V2. By using the temperature value determined thereby and the previously determined relationship between the operating temperature and the degree of tilt of the gain spectrum of the active fiber, it is possible to determine the required setting of the second variably settable attenuator VDL.

Instead of a control unit, it is possible to provide a regulating unit, not represented in FIG. 2, which requires knowledge of the respective tilt of the channel level spectrum of the optical signal OS. To that end, for example by using an optical spectrum analyser, the tilt of the channel level spectrum is measured and the required regulating signal is determined by using the measurement result, i.e. the tilt of the channel level spectrum, measured by using the optical spectrum analyser, is virtually compensated for by using the second variably settable attenuator VDL, that is to say its dB-linear attenuation profile, for example.

The arrangement of the variably settable attenuator VDL is selected by way of example in FIG. 2 between the first amplifier stage and the second amplifier stage V2. Although, the variably settable attenuator VDL may also be arranged upstream or downstream of the optical amplifier arrangement OVA, or of the respective optical amplifier stages V1, V2.

In addition, separate compensation is possible for the tilt of the channel level spectrum due to stimulated Raman scattering and for the further tilt of the channel level spectrum due to the temperature dependency of the active fiber of the at least one amplifier stage VS1, VS2. To that end, two variably settable attenuators, not represented in FIG. 2, arranged separately from one another are to be provided, by using which the said contributions to the tilt of the channel level spectrum are separately compensated for or reduced.

Figure 3:
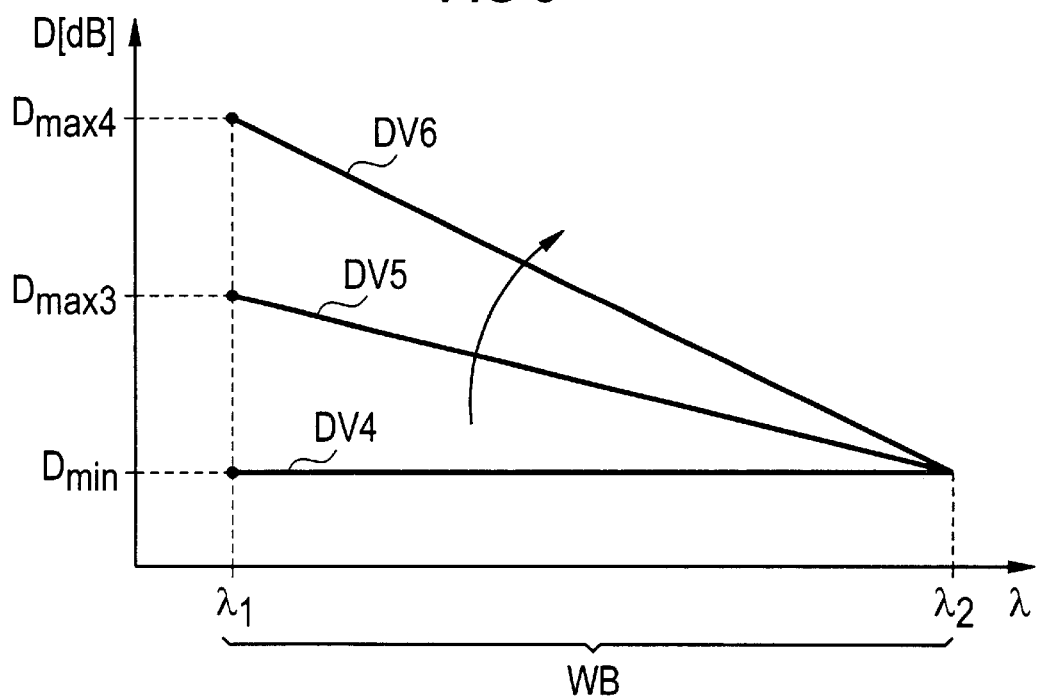
FIG. 3 is a diagram showing three further attenuation profiles for a selected wavelength range.

In FIG. 3, the attenuation profiles DV4 to DV6 are plotted as a function of wavelength λ on a further diagram. A fourth, fifth and sixth attenuation profile DV4 to DV6 being, in particular, represented in FIG. 3. The further diagram likewise has a horizontal axis λ and a vertical axis D, the wavelength λ being plotted on the horizontal axis λ and the attenuation D in dB being plotted on the vertical axis D. The fourth to sixth attenuation profiles DV4 to DV6 are represented in FIG. 3, in particular, as excerpts for the wavelength range WB from a first wavelength λ1 to a second wavelength λ2. The attenuation profiles DV1 to DV6 represented both in FIG. 3 and in FIG. 1 are possible attenuation profiles which can be produced by using the second variably settable attenuator VDL represented in FIG. 2.

The fourth attenuation profile DV4 has a flat attenuation spectrum in the relevant wavelength range WB. In this case, the fourth attenuation profile DV4 assumes a constant, for example minimum, attenuation value $D_{min}$ at the edges of the wavelength range WB as well as throughout the wavelength range WB.

The fifth attenuation profile DV5 has a decrease along the wavelength range WB, the fourth attenuation profile DV4 assuming a third maximum attenuation value $D_{max3}$ at the first wavelength λ1, and a minimum attenuation value $D_{min}$ at the second wavelength λ2. In the case of the sixth attenuation profile DV6, the decrease is greater, i.e. the fourth maximum attenuation value $D_{max4}$ at the first wavelength λ1 is substantially greater than the third maximum attenuation value $D_{max3}$ of the fifth attenuation profile DV5. It is clear from this that the regulation or control of the, for example, dB-linear tilt of the attenuation spectrum of the second variably settable attenuator VDL is essentially dictated by the maximum attenuation values $D_{max3}$, $D_{max4}$ existing at the edges of the relevant wavelength range WB.

Figure 4:
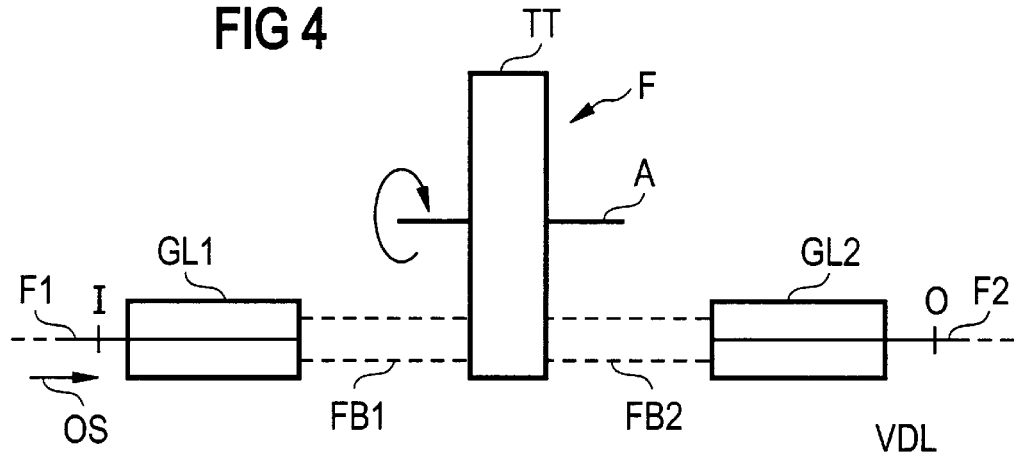
FIG. 4 is a schematic diagram showing a possible embodiment of the variably settable attenuator.

FIG. 4 represents, by way of example, a variably settable attenuator VDL, in particular for reducing dB-linear tilts of a channel level spectrum within an optical amplifier arrangement OVA. The represented embodiment of a variably settable attenuator VDL has, in particular, an input I, a first gradient lens GL1, a first free-beam region FB1, a filter F mounted displaceably along a displacement axis A, a second free-beam region FB2, a second gradient lens GL2 and an output O. A first optical fiber F1 is connected to the input I of the variably settable attenuator VDL, and a second optical fiber F2 is fed to the output O. The input I of the variably settable attenuator VDL is connected to the input of the first gradient lens GL1, the output of which is followed by the first free-beam region FB1. The first and second free-beam regions FB1, FB2 are separated from one another by the displaceably mounted filter F, the transparent substrate TT needed to produce the displaceably mounted filter F being, in particular, intended to separate the first and second free-beam regions FB1, FB2.

The second free-beam region FB2 is followed by the input of the second gradient lens GL2, the output of which is connected to the output O of the variably settable attenuator VDL. A second optical fiber OF2 is connected to the output O of the variably settable attenuator VDL.

The transparent substrate TT of the displaceably mounted filter F according to the invention can be displaced in the displacement direction A. The displaceably mounted filter F represented in FIG. 4 is, for example, configured as a rotatably mounted filter disc F, which is mounted displaceably about the displacement axis A, or rotation axis A. For example, ions or atoms with suitable absorption spectra are diffused into the transparent substrate TT of the displaceably mounted filter F, or ions or atoms with suitable absorption spectra are deposited onto the transparent substrate TT, so that different attenuation characteristics can be produced with respect to the variably settable attenuator VDL. To that end, the concentration of the diffused or deposited ions or atoms has been varied, for example, virtually uniformly along the displacement axis A of the displaceably mounted filter F, i.e. the concentration of the absorbing ions or atoms increases or decreases virtually uniformly along the displacement axis of the displaceably mounted filter F. Naturally, it is also possible to form different sectors on the transparent substrate TT of the rotatably mounted filter disc F, which have different concentrations of the absorbing ions or atoms. In the case of a transparent substrate with a virtually uniformly increasing or decreasing concentration of the deposited or diffused ions or atoms, it is possible to set different attenuation values, or attenuation spectra, by displacing the displaceably mounted filter F or the displaceably mounted filter disc F represented in FIG. 4, by rotation about the displacement axis, or rotation axis, A.

The ions and atoms chosen for this can be selected from different groups of the entire periodic table and, for example, it is particularly advantageous to select elements from the rare earth or transition metal groups.

A signal OS transmitted via the first optical fiber F1, for example consisting of several WDM channels with different wavelengths λ, is transmitted to the input I of the variably settable attenuator VDL and, by using the first gradient lens GL1, is focused and projected along the first free-beam region FB1 onto the displaceably mounted filter F or the displaceably mounted filter disc F. In this case, the focused optical signal OS may either be projected perpendicularly onto the transparent substrate TT of the displaceably mounted filter disc F or, likewise to avoid reflections, the projection may take place at an angle of less than 90° onto the transparent substrate TT. The optical signal OS attenuated by using the diffused absorption spectrum of the ions or atoms, after leaving the transparent substrate TT, is conveyed along the second free-beam path FB2 to the input of the second gradient lens GL2. By using the second gradient lens GL2, the attenuated beams of the optical signal OS, which are received at the input, are focused and injected via the output O of the variably settable attenuator VDL into the second optical fiber OF2. The attenuated optical signal OS is transmitted further via the second optical fiber OF2.

In this case, the optical radiation, or the optical signal OS, emerging from the first optical fiber F1 is collimated by using the first gradient lens GL1 and is forwarded into the first free-beam region FB1, or projected onto the rotatably mounted filter disc F. The optical signal OS passes through the transparent substrate TT of the rotatably mounted, or displaceably mounted, filter disc F and, after crossing the second free-beam region FB2 and by using the second gradient lens GL2, is focused and injected with low loss into the second optical fiber OF2. To that end, the first and second free-beam regions FB1, FB2 have an approximately parallel beam profile.

Figure 5:
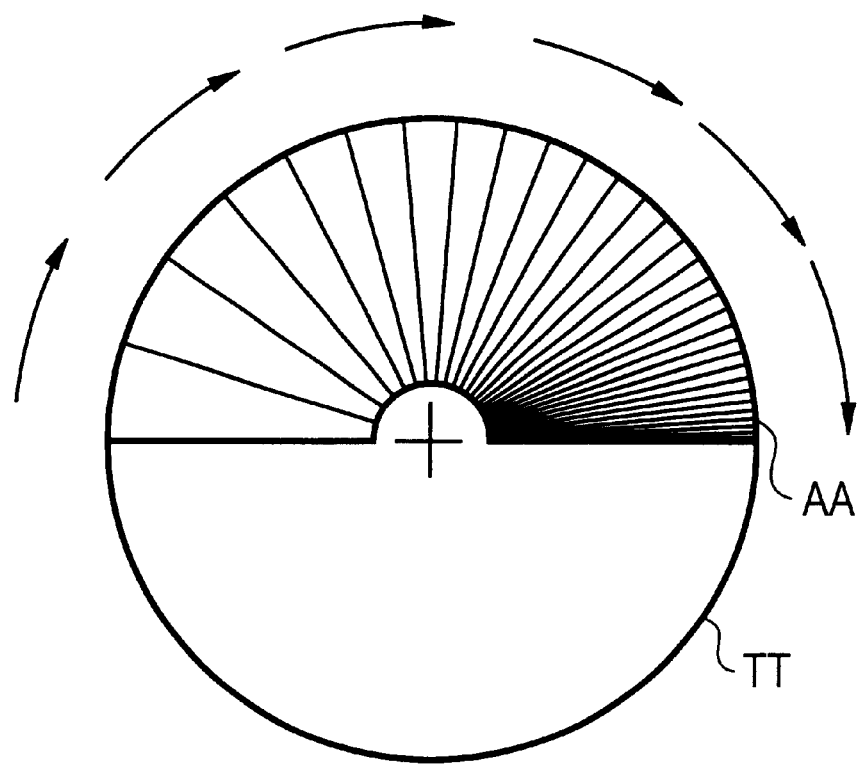
FIG. 5 shows a schematic diagram and a diagram showing a possible configuration of the displaceably mounted optical filter as a rotatably mounted filter disc and the attenuation spectrum of the deposited atoms.
Figure 5:
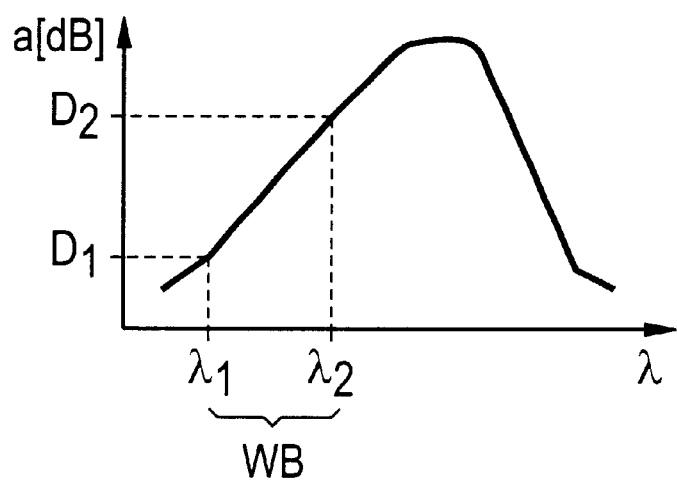

FIG. 5 represents, by way of example, a side view of the displaceably mounted filter disc F represented in FIG. 4 and the associated attenuation spectrum of the deposited atoms AA, for example. The displaceably, or rotatably, mounted filter disc F is coated with absorbing atoms AA, the concentration of which increases along the circumference. The direction of the concentration increase is indicated in FIG. 5 by using arrows extending along the circumference of the circle. The optical signal OS transmitted via the first free-beam region FB1 crosses only a small part of the rotatably mounted filter disc F, so that the concentration of the absorbing atoms AA remains approximately constant in the part of the rotatably mounted filter disc F that is crossed. By rotating the rotatably mounted filter disc F, the concentration of the atoms AA within the region or part that is crossed becomes varied, so that a different attenuation characteristic of the variably settable attenuator VDL can be produced. As well as the side view of the rotatably mounted filter disc F, FIG. 5 also represents a diagram of the attenuation spectrum of the deposited atoms AA, the diagram having a horizontal axis λ and a vertical axis a. The wavelength λ is plotted along the horizontal axis λ, and the different attenuation values a are taken into account on the vertical axis a. The attenuation profiles DV1 to DV6 represented in FIGS. 1 and 3 are excerpts of the attenuation profile represented on the diagram in FIG. 5. The used wavelength range WB extends from a first wavelength λ1 to a second wavelength λ2, i.e. the attenuation increases approximately dB-linearly within this wavelength range WB. The relevant wavelength range WB is tuned to the transmission band intended for the transmission of the optical signals OS, for example C-band, L-band, S-band, the increase of the dB-linear tilt being set through the concentration of the deposited atoms AA. By rotating the rotatably mounted filter disc F, it is possible to adjust the dB-linear tilt of the attenuation spectrum in the relevant wavelength range WB. A change in the maximum attenuation value at the edge of the wavelength band WB, in FIG. 5, for example, the second attenuation value $D_2$ at the second wavelength λ2, requires a change in the concentration of active ions or atoms AA, and therefore a change in the region of the transparent substrate TT of the rotatably mounted filter disc F that is crossed by the focused optical signal OS.

The shapes of the attenuation spectrum and of the usable wavelength range WB are established by the selection of the dopant atoms or dopant ions. As an alternative way of synthesising a required attenuation spectrum, instead of a single ion or atom, it is possible for several different ions or atoms, the absorption spectra of which are superimposed in the desired way in the used wavelength range WB, to be diffused or deposited in a mixture.

Figure 6:
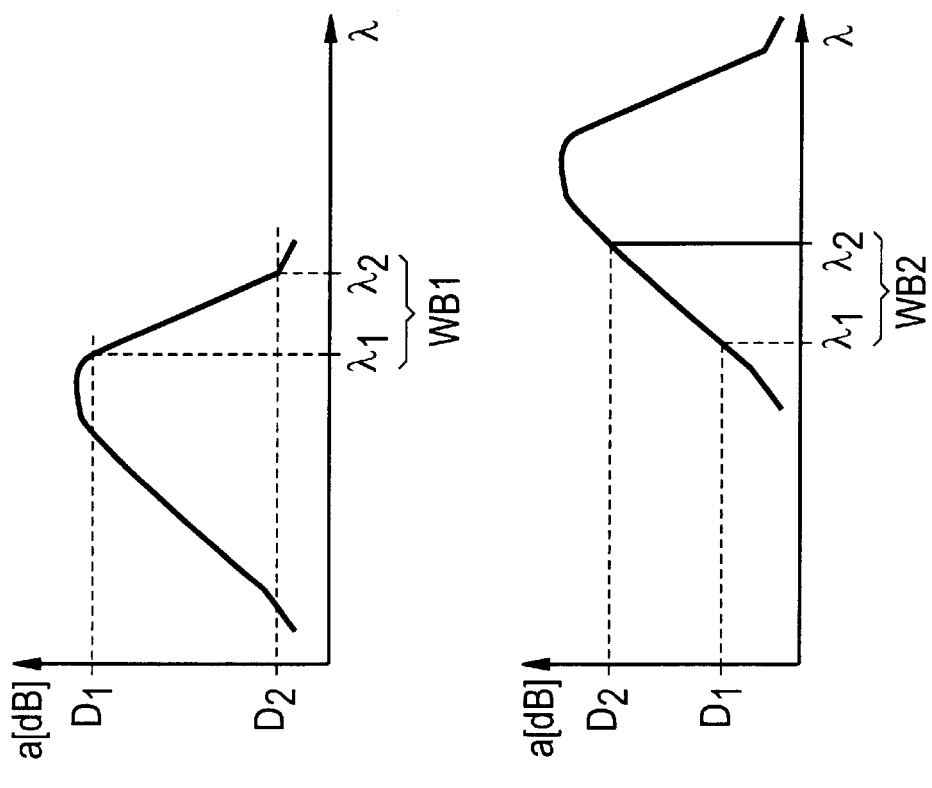
FIG. 6 shows a schematic diagram and two diagrams showing a possible configuration of the rotatably mounted filter disc with two different attenuation spectra.
Figure 6:
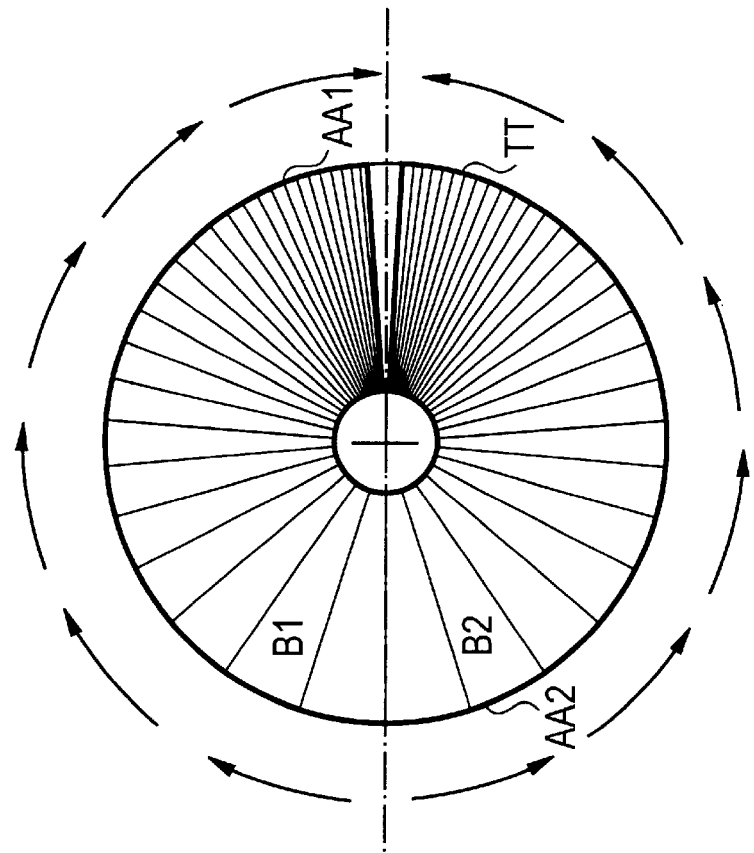

FIG. 6 represents, by way of example, an alternative embodiment of the rotatably mounted filter disc F, and of the transparent substrate TT, which has two different regions B1, B2 which are coated with different atoms or ions. In this case, the rotatably mounted filter disc F has a first region B1, coated with first atoms AA1, and a second region B2, coated with second atoms AA2. The absorption spectra of the first and second atoms AA1, AA2 are respectively represented in a first and second diagram S1, S2.

Similarly to the diagram represented in FIG. 1, the first and second diagrams S1, S2 likewise have a horizontal axis λ and a vertical axis a in dB. The wavelength λ is plotted along the horizontal axis λ, and the attenuation a in dB is plotted along the vertical axis. In the first diagram S1, a strong decrease of the attenuation spectrum from the first wavelength λ1 to the second wavelength λ2 can be seen in the relevant first wavelength ranges WB1. In the second diagram S2, a medium-strength increase of the attenuation spectrum from the first wavelength λ1 to the second wavelength λ2 can be seen in the relevant second wavelength range WB2. By rotating the rotatably mounted filter F, it is possible to set an individually required slope of the attenuation spectrum, by selecting the concentration and the region B1, B2, in order to compensate for the tilt of the channel level spectrum of the optical signal OS.

In this case, the regulation is carried out in each case via the rotation angle of the rotatably mounted filter disc F by a regulating signal derived from the operating state of the optical transmission system. Depending on the rotation angle, by using the rotatably mounted filter disc F represented in FIG. 6, it is possible to set attenuation profiles DV1 to DV6 that increase or decrease as the wavelength λ rises.

The variably settable attenuator VDL according to the invention is not restricted to being used in optical amplifier arrangements OVA but, rather, can be used at any desired points of an optical transmission system where a, for example, dB-linear tilt of the channel level spectrum, for example of an optical transmission signal OS, is to be virtually compensated for or reduced.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An optical amplifier arrangement comprising:
   at least one optical amplifier stage;
   a first variably settable attenuator configured to reduce tilt of a channel level spectrum due to a rise of channel levels of optical signals, the first variably settable attenuator having first attenuation spectrum that changes proportionally to an optical signal wavelength; and
   a second variably settable attenuator configured to reduce tilt of channel level spectrum due to stimulated Raman scattering introduced at an input of the at least one optical amplifier stage, a second attenuation spectrum of the second variably settable attenuator changing proportionally to the optical signal wavelength, and a profile of the second attenuation spectrum capable of being variably set.

2. The optical amplifier arrangement according to claim 1, wherein the first attenuation spectrum is dB-linear.

3. The optical amplifier arrangement according to claim 2, wherein an increase of the dB-linear first attenuation spectrum is set by an attenuation value needed for the attenuation of the smallest or largest wavelength.

4. The optical amplifier arrangement according to claim 3, further comprising a control unit or a regulating unit in driving connection with the first variably settable attenuator.

5. The optical amplifier arrangement according to claim 2, further comprising a settable attenuator with a flat attenuation spectrum, having virtually the same attenuation per channel, which further reduces the dB-linear tilt of the channel level spectrum.

6. The optical amplifier arrangement according to claim 1, further comprising a control unit or a regulating unit in driving connection with the first variably settable attenuator.

7. The optical amplifier arrangement according to claim 1, further comprising an optical filter for leveling the gain spectrum of the at least one optical amplifier stage.

8. The optical amplifier arrangement according to claim 1, wherein the second variably settable attenuator is configured to reduce tilt of the channel level spectrum due to temperature dependency of active fibres of the at least one amplifier stage.

9. The optical amplifier arrangement according to claim 8, wherein the first and second variably settable attenuators are arranged upstream or downstream of the at least one optical amplifier stage or between at least two optical amplifier stages.

10. The optical amplifier arrangement according to claim 1, where the first variably settable attenuator comprises a displaceably mounted filter, which is constructed from a transparent substrate into which ions or atoms with a suitable absorption spectrum are diffused, or onto which ions or atoms with a suitable absorption spectrum are deposited, and wherein a concentration of the absorbing ions or atoms increases or decreases along a displacement direction of the displaceably mounted filter.

11. The optical amplifier according to claim 10, wherein the first variably settable attenuator further comprises a first and a second gradient lens, the displaceably mounted filter being arranged between the first and second gradient lenses and separated from them by a first and a second free-beam region.

12. The optical amplifier arrangement according to claim 10, wherein the concentration of the absorbing ions or atoms increases or decreases substantially uniformly along the displacement direction of the displaceably mounted filter.

13. The optical amplifier arrangement according to claim 10, wherein the displaceably mounted filter is a rotatably mounted filter disc made of a transparent substrate.

14. The optical amplifier arrangement according to claim 10, wherein the concentration of the absorbing ions or atoms is virtually constant at a site where a focused optical signal strikes the transparent substrate.

15. The optical amplifier arrangement according to claim 10, wherein attenuation properties of the first variably settable attenuator can be set by moving the displaceably mounted optical filter along the displacement direction.

16. The optical amplifier arrangement according to claim 10, wherein the transparent substrate is divided into a first and a second attenuation region, whose absorption spectra are different.

* * * * *